(12) United States Patent
Yamine et al.

(10) Patent No.: US 10,523,496 B2
(45) Date of Patent: Dec. 31, 2019

(54) HANDLING OF PERFORMANCE DEGRADATION IN A COMMUNICATIONS SYSTEM

(71) Applicant: Telefonaktiebolaget LM Ericsson (publ), Stockholm (SE)

(72) Inventors: Badawi Yamine, Beirut (LB); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/727,202

(22) Filed: Oct. 6, 2017

(65) Prior Publication Data

US 2018/0324032 A1 Nov. 8, 2018

(30) Foreign Application Priority Data

May 4, 2017 (EP) .................................. 17169567

(51) Int. Cl.
| | |
|---|---|
| *H04L 12/24* | (2006.01) |
| *H04W 24/04* | (2009.01) |
| *G06F 11/34* | (2006.01) |
| *H04L 12/26* | (2006.01) |

(52) U.S. Cl.
CPC ...... *H04L 41/0654* (2013.01); *G06F 11/3466* (2013.01); *H04L 41/0609* (2013.01); *H04L 41/069* (2013.01); *H04W 24/04* (2013.01); *H04L 41/5035* (2013.01); *H04L 43/0817* (2013.01)

(58) Field of Classification Search
None
See application file for complete search history.

(56) References Cited

U.S. PATENT DOCUMENTS

| | | | |
|---|---|---|---|
| 2006/0239216 A1 | 10/2006 | Chen et al. | |
| 2010/0203881 A1* | 8/2010 | del Rio Romero | ... H04W 24/02 455/423 |
| 2011/0250880 A1 | 10/2011 | Olsson et al. | |
| 2012/0106356 A1 | 5/2012 | Johansson et al. | |
| 2014/0051416 A1 | 2/2014 | Loborg et al. | |

(Continued)

FOREIGN PATENT DOCUMENTS

| | | |
|---|---|---|
| CN | 103856980 A | 6/2014 |
| EP | 2693810 A1 | 2/2014 |

(Continued)

OTHER PUBLICATIONS

Fidyatun, Nisa et al., "Simulation of Fault Management with Self Healing Mechanism", 10th International Conference on Telecommunication Systems Services and Applications (TSSA), IEEE, Denpasar, Indonesia, Oct. 2016, pp. 1-10.

(Continued)

*Primary Examiner* — Diane L Lo
(74) *Attorney, Agent, or Firm* — Murphy, Bilak & Homiller, PLLC

(57) ABSTRACT

There are provided mechanisms for handling network performance degradation in a communications system. A method is performed by a wireless device. The method comprises detecting occurrence of a KPI event associated with a first radio access network node. The method comprises reporting the KPI event to an OSS entity via a second radio access network node.

16 Claims, 7 Drawing Sheets

(56) References Cited

U.S. PATENT DOCUMENTS

| | | |
|---|---|---|
| 2015/0050925 A1 | 2/2015 | Tapia |
| 2015/0304981 A1* | 10/2015 | Peng .................... H04W 64/00 455/456.1 |
| 2016/0218912 A1* | 7/2016 | Vincze ................ H04L 41/0672 |
| 2016/0285679 A1 | 9/2016 | Dudda et al. |
| 2017/0012841 A1* | 1/2017 | Ketheesan .......... H04L 41/0823 |

FOREIGN PATENT DOCUMENTS

| | | | |
|---|---|---|---|
| EP | 2763454 A1 | 8/2014 | |
| EP | 3136777 A1 * | 3/2017 | ............ H04W 24/10 |
| WO | 2014180714 A1 | 11/2014 | |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT);", 3GPP TS 37.320 V13.1.0, Mar. 2016, pp. 1-26.

* cited by examiner

HANDLING OF PERFORMANCE DEGRADATION IN A COMMUNICATIONS SYSTEM

RELATED APPLICATIONS

This application claims priority from EP application number EP17169567.9, as filed on 4 May 2017.

TECHNICAL FIELD

Embodiments presented herein relate to methods, a wireless device, an OSS entity, a radio access network node, computer programs, and a computer program product for handling network performance degradation in a communications system.

BACKGROUND

In communications networks, there may be a challenge to obtain good performance and capacity for a given communications protocol, its parameters and the physical environment in which the communications system is deployed.

For example, one parameter in providing good performance and capacity for a given communications protocol in a communications system is the ability for the communications system itself to be enabled to detect problems and automatically solve them without human intervention.

Further, low latency could be required in applications such as unmanned or autonomous ground vehicles (also referred to as autonomous cars, driverless cars, self-driving cars, and robotic cars, and hereinafter ground vehicle for short), remotely controlled unmanned aerial vehicles (UAV for short and commonly referred to as drones, and hereinafter aerial vehicle for short), and remote surgery, to only mention a few examples.

Assume, for example, that a driverless car is operatively connected to a radio access network node capable of providing a low latency service (with a typical delay of less than 5 ms), and that the network node experiences an issue causing a Key Performance Indicator (KPI) event, e.g. caused by consecutive call setup failures. The radio access network node would typically report the KPI event to an Operations Support System (OSS) entity on regular time intervals, such as every 15 minutes in order to minimize signalling in the communications system. Either the driverless car would not move until the issue causing the KPI event is solved (possibly after application of auto-healing trigged by the OSS entity), or the driverless car might be handed over, or otherwise redirected, to another non-latency service (with a typical delay of 20 ms or more). In the latter case the non-latency service has a practical latency which is too high for serving a driverless car.

Hence, there is still a need for an improved handling of KPI events in communications systems.

SUMMARY

An object of embodiments herein is to provide efficient handling of KPI events in communications systems.

According to a first aspect there is presented a method for handling network performance degradation in a communications system. The method is performed by a wireless device. The method comprises detecting occurrence of a KPI event associated with a first radio access network node. The method comprises reporting the KPI event to an OSS entity via a second radio access network node.

According to a second aspect there is presented a wireless device for handling network performance degradation in a communications system. The wireless device comprises processing circuitry. The processing circuitry is configured to cause the wireless device to detect occurrence of a KPI event associated with a first radio access network node. The processing circuitry is configured to cause the wireless device to report the KPI event to an OSS entity via a second radio access network node.

According to a third aspect there is presented a wireless device for handling network performance degradation in a communications system. The wireless device comprises processing circuitry and a storage medium. The storage medium stores instructions that, when executed by the processing circuitry, cause the wireless device to perform operations, or steps. The operations, or steps, cause the wireless device to detect occurrence of a KPI event associated with a first radio access network node. The operations, or steps, cause the wireless device to report the KPI event to an OSS entity via a second radio access network node.

According to a fourth aspect there is presented a wireless device for handling network performance degradation in a communications system. The wireless device comprises a detect module configured to detect occurrence of a KPI event associated with a first radio access network node. The wireless device comprises a report module configured to report the KPI event to an OSS entity via a second radio access network node.

According to a fifth aspect there is presented a computer program for handling network performance degradation in a communications system, the computer program comprises computer program code which, when run on processing circuitry of a wireless device, causes the wireless device to perform a method according to the first aspect.

According to a sixth aspect there is presented a method for handling network performance degradation in a communications system. The method is performed by an OSS entity. The method comprises obtaining a KPI report from a wireless device via a second radio access network node. The KPI report pertains to occurrence of a KPI event as detected by the wireless device associated with a first radio access network node. The method comprises initiating auto-healing of the first radio access network node based on the KPI report. The initiating is triggered by the OSS entity having obtained the KPI report.

According to a seventh aspect there is presented an OSS entity for handling network performance degradation in a communications system. The OSS entity comprises processing circuitry. The processing circuitry is configured to cause the OSS entity to obtain a KPI report from a wireless device via a second radio access network node. The KPI report pertains to occurrence of a KPI event as detected by the wireless device associated with a first radio access network node. The processing circuitry is configured to cause the OSS entity to initiate auto-healing of the first radio access network node based on the KPI report. The initiating is triggered by the OSS entity having obtained the KPI report.

According to an eighth aspect there is presented an OSS entity for handling network performance degradation in a communications system. The OSS entity comprises processing circuitry and a storage medium. The storage medium stores instructions that, when executed by the processing circuitry, cause the OSS entity to perform operations, or steps. The operations, or steps, cause the OSS entity to obtain a KPI report from a wireless device via a second radio access network node. The KPI report pertains to occurrence of a KPI event as detected by the wireless device associated with a first radio access network node. The operations, or steps, cause the OSS entity to initiate auto-healing of the first radio access network node based on the KPI report. The initiating is triggered by the OSS entity having obtained the KPI report.

According to a ninth aspect there is presented an OSS entity for handling network performance degradation in a communications system. The OSS entity comprises an obtain module configured to obtain a KPI report from a wireless device via a second radio access network node. The KPI report pertains to occurrence of a KPI event as detected by the wireless device associated with a first radio access network node. The OSS entity comprises an initiate module configured to initiate auto-healing of the first radio access network node based on the KPI report. The initiating is triggered by the OSS entity having obtained the KPI report.

According to a tenth aspect there is presented a computer program for handling network performance degradation in a communications system, the computer program comprises computer program code which, when run on processing circuitry of an OSS entity, causes the OSS entity to perform a method according to the sixth aspect.

According to an eleventh aspect there is presented a method for handling network performance degradation in a communications system. The method is performed by a radio access network node. The radio access network node is configured for time scheduled KPI reporting. The method comprises obtaining an indication of a KPI event. The method comprises reporting the KPI event to an OSS entity independently from the time scheduled KPI reporting.

According to a twelfth aspect there is presented a radio access network node for handling network performance degradation in a communications system. The radio access network node is configured for time scheduled KPI reporting. The radio access network node comprises processing circuitry. The processing circuitry is configured to cause the radio access network node to obtain an indication of a KPI event. The processing circuitry is configured to cause the radio access network node to report the KPI event to an OSS entity independently from the time scheduled KPI reporting.

According to a thirteenth aspect there is presented a radio access network node for handling network performance degradation in a communications system, wherein the radio access network node is configured for time scheduled KPI reporting. The radio access network node comprises processing circuitry and a storage medium. The storage medium stores instructions that, when executed by the processing circuitry, cause the radio access network node to perform operations, or steps. The operations, or steps, cause radio access network node to obtain an indication of a KPI event. The operations, or steps, cause radio access network node to report the KPI event to an OSS entity independently from the time scheduled KPI reporting.

According to a fourteenth aspect there is presented a radio access network node for handling network performance degradation in a communications system. The radio access network node is configured for time scheduled KPI reporting. The radio access network node comprises an obtain module configured to obtain an indication of a KPI event. The radio access network node comprises a report module configured to report the KPI event to an OSS entity independently from the time scheduled KPI reporting.

According to a fifteenth aspect there is presented a computer program for handling network performance degradation in a communications system, the computer program comprising computer program code which, when run on processing circuitry of a radio access network node, causes the radio access network node to perform a method according to the eleventh aspect.

According to a sixteenth aspect there is presented a computer program product comprising a computer program according to at least one of the fifth aspect, the tenth aspect, and the fifteenth aspect and a computer readable storage medium on which the computer program is stored. The computer readable storage medium can be a non-transitory computer readable storage medium.

Advantageously these methods, these wireless devices, these OSS entities, these radio access network nodes, and these computer programs provide efficient handling of KPI events in the communications system.

Advantageously these methods, these wireless devices, these OSS entities, these radio access network nodes, and these computer programs enable the network-side, as represented by the OSS entity, to be notified about any issues causing a KPI event to be generated as soon as the issue occurs. This makes it possible to trigger auto-healing as early as possible, thereby the issue to be solved as soon as possible.

It is to be noted that any feature of the first, second, third, fourth, fifth, sixth seventh, eighth, ninth, tenth, eleventh, twelfth, thirteen, fourteenth, fifteenth and sixteenth aspects may be applied to any other aspect, wherever appropriate. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
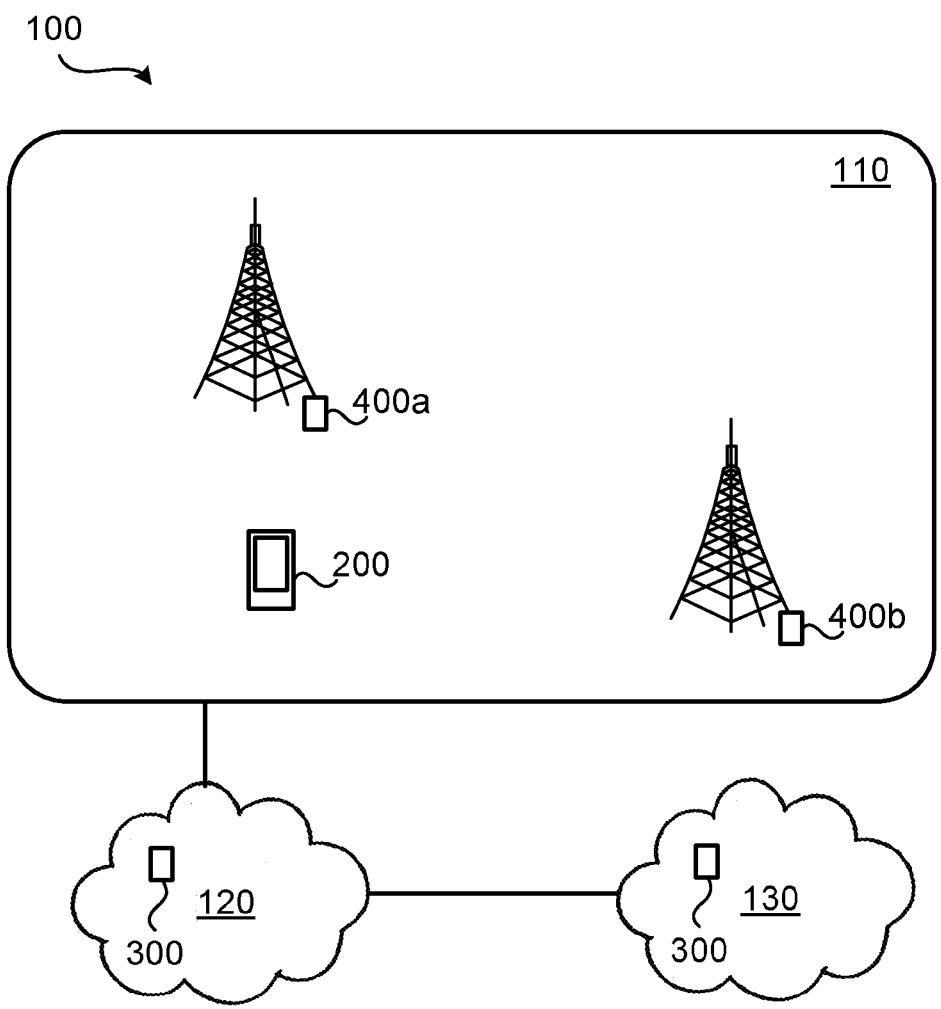
FIG. 1 is a schematic diagram illustrating a communications system wherein the herein disclosed embodiments are applicable.

FIG. 1 is a schematic diagram illustrating a communications system 100 where embodiments presented herein can be applied. The communications system 100 comprises a radio access network 120 in which radio access network nodes 400a, 400b provide network access in cells, a core network 120, and a service network 130. The radio access network 110 is operatively connected to the core network 120 which in turn is operatively connected to the service network 130. The radio access network nodes 400a, 400b thereby enables wireless devices 200 to access services and exchange data as provided by the service network 130.

The wireless devices 200 could be assumed to be capable of accessing a low latency service in the communications system 100. How the wireless devices 200 could establish network access to the low latency network service will be described below. Examples of wireless devices 200 include, but are not limited to, mobile stations, mobile phones, handsets, wireless local loop phones, user equipment (UE), smartphones, laptop computers, tablet computers, sensors, actuators, modems, repeaters, network-equipped Internet of Things devices, and network-equipped vehicles. In some aspects, the wireless device 200 is a low latency wireless device.

Examples of radio access network nodes 400a, 400b include, but are not limited to, radio base stations, base transceiver stations, Node Bs, evolved Node Bs, gigabit Node Bs (in communications systems denoted "new radio" or NR for short), and access points. As the skilled person understands, the communications system 100 may comprise a plurality of radio access network nodes 400a, 400b, each providing network access to a plurality of wireless devices 200.

The herein disclosed embodiments are not limited to any particular number of radio access network nodes 400a, 400b or wireless devices 200.

An operations support systems (OSS) entity 300 is provided in the core network 120. In general terms, the OSS entity 300 supports management functions, such as network inventory, service provisioning, network configuration, KPI monitoring and fault management, in the communications system 100. Properties of the OSS entity 300 relevant for the embodiments disclosed herein will be described below.

As disclosed above, the radio access network nodes 400a, 400b could typically report KPI events to the OSS entity 300 on regular time intervals, such as every 15 minutes in order to minimize signalling in the communications system. Hence, the OSS entity 300 might have to wait for 15 minutes in order to receive KPI reports from the radio access network nodes 400a, 400b in order to detect and at least try to solve the issue. But waiting for 15 minutes not only will be a long period but also by observing the KPI reports alone during low traffic periods might not lead to a detection that there is an issue. For example, in periods of low traffic the OSS entity 300 might not detect call setup failures since the OSS entity 300 suspects the number of successful calls to be low. It might thus not be until periods of high traffic that the OSS entity 300 detects that the number of successful calls are suspected to be too low, thereby detecting the issue in the network.

It could further be assumed that there are occasions where the wireless device 200 experiences an issue that causes an KPI event to be generated, without the network-side, such as the OSS entity 300 or even the radio access network nodes 400a, 400b being aware of such issues. An example is when the wireless device 200 experiences consecutive call setup failures even though the radio conditions radio coverage and radio link quality are good. Such call setup failures could be due to issues in the network. For example, there could be a high level of uplink interference or hardware/software issues at the radio access network nodes 400a, 400b, etc. That is, in some scenarios the network-side is unaware about issues in the network, such as call setup failures as experienced by the wireless device 200 at the user-side. Thus, even though there might be auto-healing implemented on the radio access network nodes 400a, 400b and on the OSS entity 300, no action will be taken from the network-side in order to solve the issue causing the KPI event. One way could be for the subscriber of the wireless device 200 that experiences the issue causing the KPI event to call an operator customer service centre to manually notify about the call failures. But there is no guarantee that the subscriber will notify the operator customer service centre about the call failures. Even in a case where such a notification is made the time interval between occurrence of the issue causing the KPI report and technical staff detecting and solving the issue might be long.

The embodiments disclosed herein thus relate to mechanisms for handling network performance degradation in a communications system 100. In order to obtain such mechanisms there is provided a wireless device 200, a method performed by the wireless device 200, a computer program product comprising code, for example in the form of a computer program, that when run on processing circuitry of the wireless device 200, causes the wireless device 200 to perform the method. In order to obtain such mechanisms there is further provided an OSS entity 300, a method performed by the OSS entity 300, and a computer program product comprising code, for example in the form of a computer program, that when run on processing circuitry of the OSS entity 300, causes the OSS entity 300 to perform the method. In order to obtain such mechanisms there is further provided a radio access network node 400a, 400b, a method performed by the radio access network node 400a, 400b, and a computer program product comprising code, for example in the form of a computer program, that when run on processing circuitry of the radio access network node 400a, 400b, causes the radio access network node 400a, 400b to perform the method.

Figure 2:
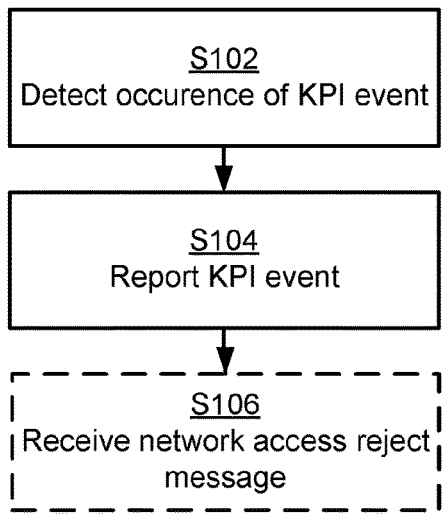
FIGS. 2, 3, 4, and 9 are flowcharts of methods according to embodiments.

FIG. 2 is a flowchart illustrating embodiments of methods for handling network performance degradation in a communications system 100 as performed by the wireless device

Figure 3:
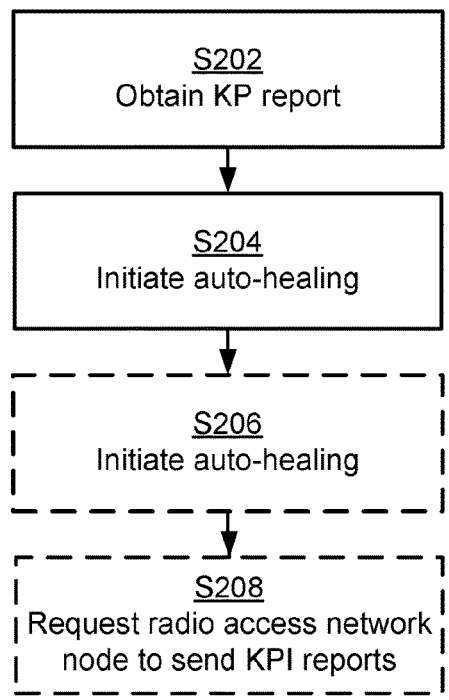
Figure 4:
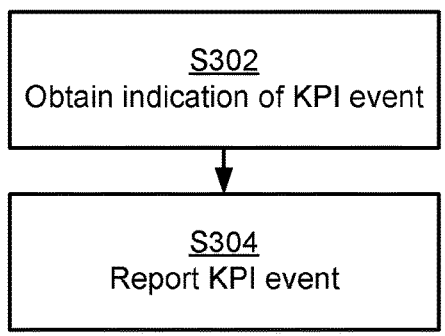

200. FIG. 3 is a flowchart illustrating embodiments of methods for handling network performance degradation in a communications system 100 as performed by the OSS entity 300. FIG. 4 is a flowchart illustrating embodiments of methods for handling network performance degradation in a communications system 100 as performed by the radio access network node 400*a*, 400*b*. The methods are advantageously provided as computer programs.

Reference is now made to FIG. 2 illustrating a method for handling network performance degradation in a communications system 100 as performed by the wireless device 200 according to an embodiment.

In principle, when the wireless device 200 has detected occurrence of a KPI event associated with a first radio access network node it reports the KPI event to the OSS entity 300 via a second radio access network node. Particularly, the wireless device is configured to perform steps S102 and S104:

S102: The wireless device 200 detects occurrence of a KPI event associated with a first radio access network node (either radio access network node 400*a*, or radio access network node 400*b*). Examples factors that cause the KPI event to occur will be provided below.

S104: The wireless device 200 reports the KPI event to the OSS entity 300 via a second radio access network node (either radio access network node 400*a*, or radio access network node 400*b*). The KPI event as reported will hereinafter be denoted a KPI report.

Embodiments relating to further details of handling network performance degradation in a communications system 100 as performed by the wireless device 200 will now be disclosed.

There may be different factors that cause the KPI event to occur, and thus for the wireless device 200 to be able to detect occurrence of the KPI event. In some embodiments the KPI event is caused by a network access establishment failure, a dropped network connection, or at least one radio condition being below a threshold value. Examples of radio conditions are measurements on reference signals, such as reference signal received power (RSRP) and reference signal received quality (RSRQ). Each type of radio condition could have its own threshold value. Further aspects of these factors that cause the KPI event to be registered will be disclosed below with reference to FIGS. 5, 6, 7, and 8.

In some aspects, one and the same KPI event relates to more than one successive failed attempts for network access establishment. In such cases the KPI report could reflect all these successive failed attempts. Hence, according to an embodiment the KPI event pertains to N successive failed attempts for network access establishment, and the KPI report reflects these N>1 successive failed attempts, where N>1 is an integer. This would save network resources since a single KPI report would be transmitted.

In embodiments where the KPI event is caused by a network access establishment failure, the KPI event is reported in a network access request message. That is, when a new call is established with the radio access network node 400*b*, the wireless device 200 reports a call setup failure with the radio access network node 400*a* in a call setup message to the radio access network node 400*b*. Further aspects relating thereto will be disclosed below with reference to FIG. 5.

In embodiments where the KPI event is caused by a dropped network connection, the KPI event is reported in a network access re-establishment message. That is, when a call is re-established (with either radio access network node 400*a* or radio access network node 400*b*) the wireless device 200 reports a dropped call failure in call re-establishment message. Further aspects relating thereto will be disclosed below with reference to FIGS. 6 and 7.

In some aspects, the wireless device 200 is in connected mode when detecting occurrence of the KPI event (such as when the KPI event is caused by a network access establishment failure or dropped network connection).

In embodiments where the KPI event is caused by at least one radio condition being below a threshold value, the KPI event is reported in a modified network access request message. Further aspects relating thereto will be disclosed below with reference to FIG. 8.

The modified network access request message could be responded to by the second radio access network node 400*a*, 400*b* transmitting a network access reject message. Hence, according to an embodiment the wireless device 200 is configured to perform step S106:

S106: The wireless device 200 receives, from the second radio access network node 400*a*, 400*b*, a network access reject message in response to having reported the KPI event.

In some aspects, the wireless device 200 is in idle mode when detecting occurrence of the KPI event (such as when the KPI event is caused by at least one radio condition being below a threshold value).

Figure 5:
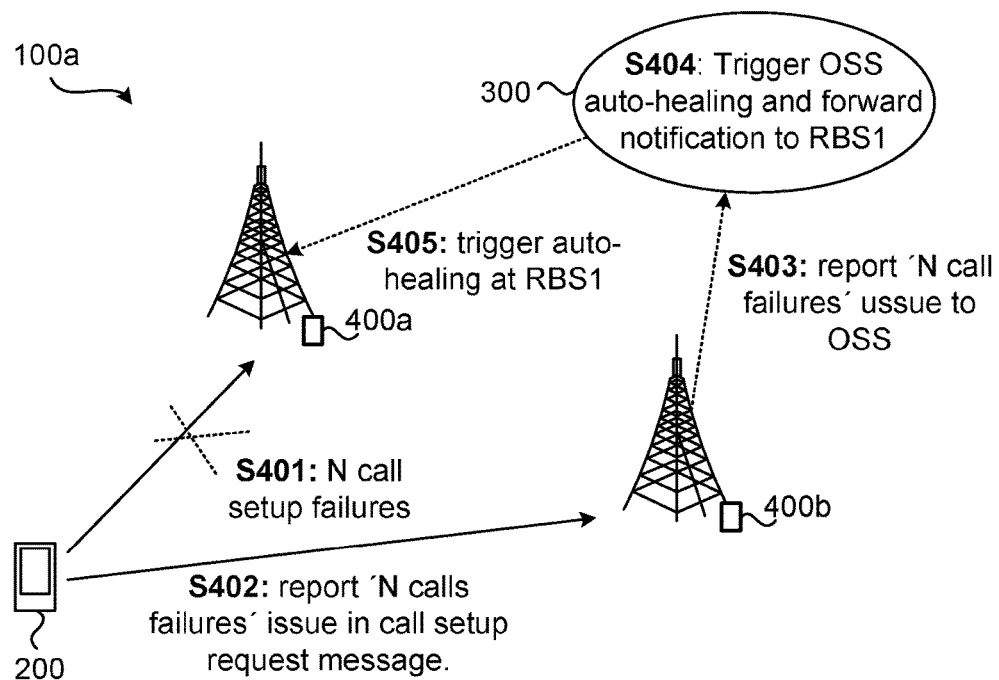
FIGS. 5, 6, 7, and 8 are schematic illustration of parts of the communications system in FIG. 1 according to embodiments.
Figure 7:
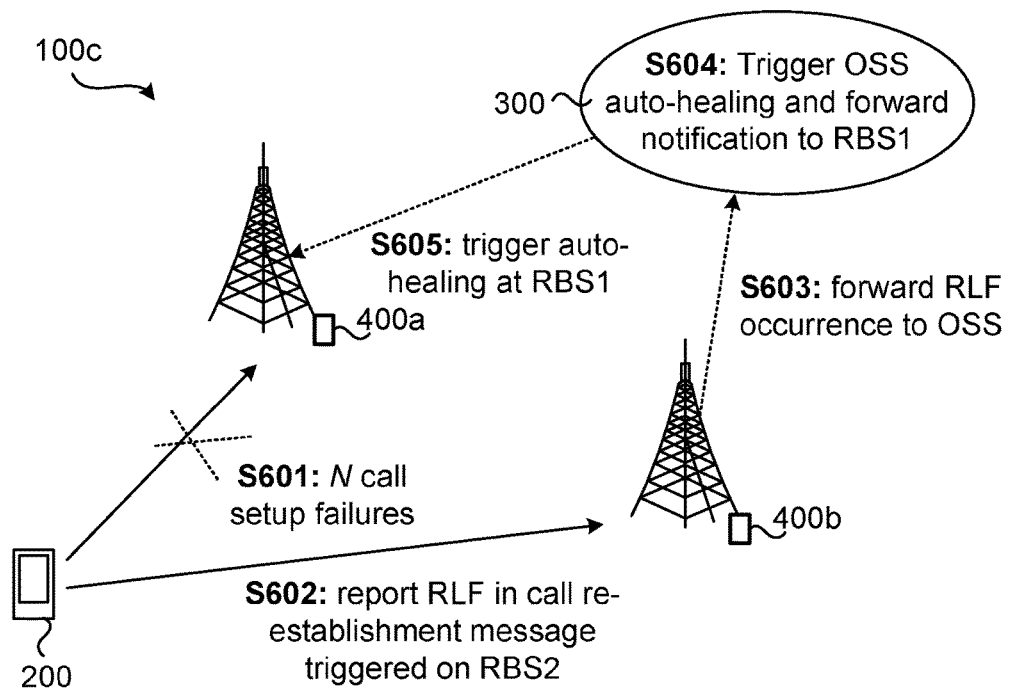

In some aspects, the first radio access network node is physically and/or logically separated from the second radio access network node, such as in the embodiments of FIGS. 5 and 7. That is, in an embodiment the first radio access network node and the second radio access network node are two mutually different radio access network nodes 400*a*, 400*b*. In the embodiments of FIGS. 5 and 7 the first radio access network node is identified at reference numeral 400*a* and the second radio access network node is identified at reference numeral 400*b*.

Figure 6:
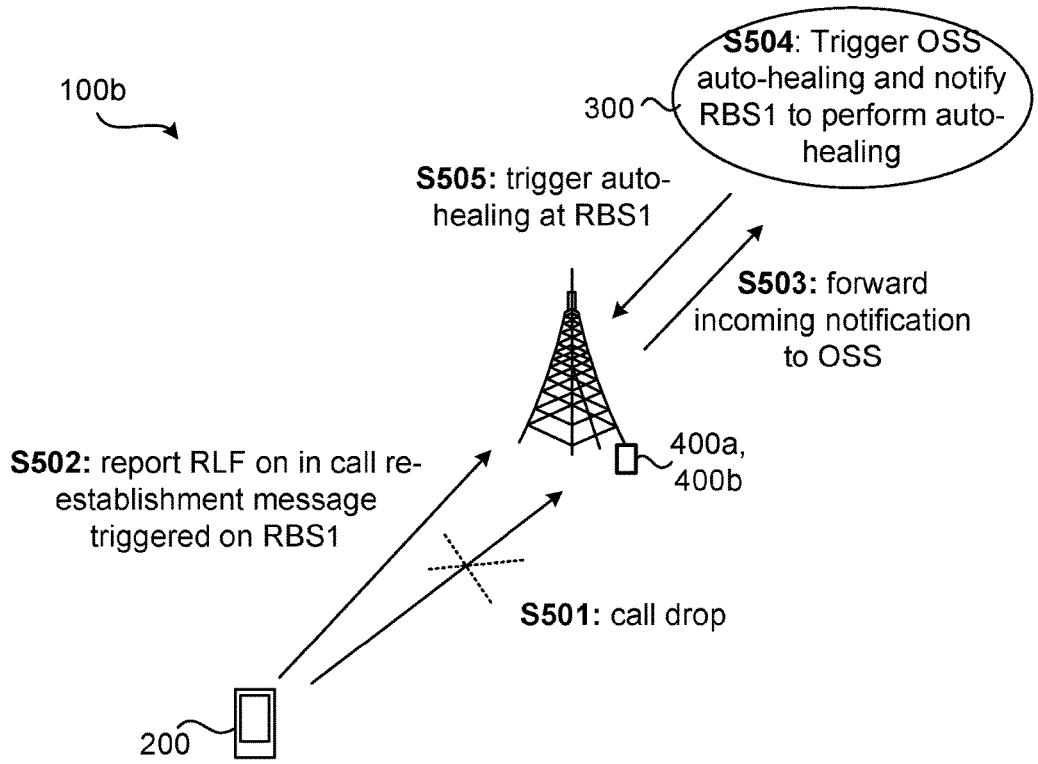
Figure 8:
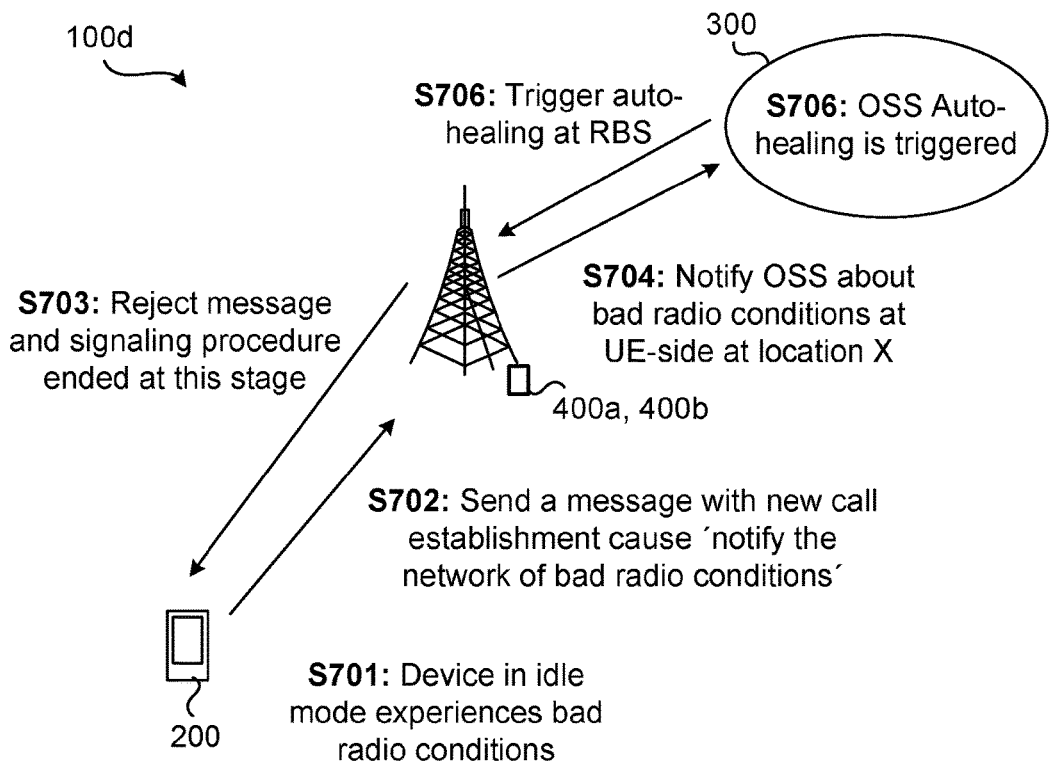

In other aspects, the first radio access network node and the second radio access network node are one and the same radio access network node, such as in the embodiments of FIGS. 6 and 8. That is, in an embodiment the first radio access network node and the second radio access network node are one and the same radio access network node. In the embodiments of FIGS. 6 and 8 the first radio access network node and the second radio access network node are both identified at reference numerals 400*a*, 400*b*.

Reference is now made to FIG. 3 illustrating a method for handling network performance degradation in the communications system 100 as performed by the OSS entity 300 according to an embodiment.

As disclosed above, upon detecting occurrence of a KPI event associated with a first radio access network node the wireless device 200 reports the KPI event to the OSS entity 300 via a second radio access network node. It is assumed that the OSS entity 300 obtains the KPI report of the KPI event. Hence, the OSS entity 300 is configured to perform step S202:

S202: The OSS entity 300 obtains a KPI report from a wireless device 200 via a second radio access network node 400*a*, 400*b*. The KPI report pertains to occurrence of a KPI event as detected by the wireless device 200 associated with a first radio access network node 400*a*, 400*b*.

Upon having received the KPI report, the OSS entity 300 initiates auto-healing of at least the first radio access network node. Particularly, the OSS entity 300 is configured to perform step S204:

S204: The OSS entity 300 initiates auto-healing of the first radio access network node 400*a*, 400*b* based on the KPI report. The initiation of the auto-healing is triggered by the OSS entity 300 having obtained the KPI report (as in step S202).

Embodiments relating to further details of handling network performance degradation in the communications system 100 as performed by the OSS entity 300 will now be disclosed.

In some aspects auto-healing is further be initiated for the second radio access network node 400a, 400b and/or the OSS entity 300 itself. Hence, according to an embodiment the OSS entity 300 is configured to perform step S206:

S206: The OSS entity 300 initiates auto-healing of at least one of the second radio access network node 400a, 400b and the OSS entity 300 itself based on the KPI report. The initiation of the auto-healing is triggered by the OSS entity 300 having obtained the KPI report (as in step S202).

In some aspects, the OSS entity 300 requests the first radio access network node 400a, 400b to send KPI reports to the OSS entity 300 immediately (without waiting for scheduled KPI reporting). Particularly, according to an embodiment the first radio access network node 400a, 400b is configured for time scheduled KPI reporting to the OSS entity 300 and the OSS entity 300 is configured to perform step S208:

S208: The OSS entity requests the first radio access network node (400a, 400b) to send its KPI reports independently from said time scheduled KPI reporting. The first radio access network node 400a, 400b could thereby be requested to send a KPI report at a very short interval from the first radio access network node 400a, 400b having detected occurrence of an KPI event.

In some aspects, the first radio access network node 400a, 400b is requested to send KPI reports without waiting for scheduled KPI reporting. Particularly, according to an embodiment the time scheduled KPI reporting specifies the first radio access network node 400a, 400b to send its KPI reports only at scheduled KPI reporting occurrences, and the first radio access network node 400a, 400b is, in step S208, requested to send its KPI reports without waiting for a next scheduled KPI reporting occurrence.

As disclosed above, in some embodiments the first radio access network node and the second radio access network node are two mutually different radio access network nodes 400a, 400b, and in other embodiments the first radio access network node and the second radio access network node are one and the same radio access network node Reference is now made to FIG. 4 illustrating a method for handling network performance degradation in a communications system 100 as performed by the radio access network node 400a, 400b according to an embodiment. The radio access network node 400a, 400b is configured for time scheduled KPI reporting.

In general terms, the radio access network node 400a, 400b is configured to report KPI events to the OSS entity 300 without waiting for scheduled KPI reporting. Particularly, the radio access network node 400a, 400b is configured to perform steps S302 and S304:

S302: The radio access network node 400a, 400b obtains an indication of a KPI event. Examples of different ways for the radio access network node 400a, 400b to obtain the indication of the KPI event will be disclosed below.

S304: The radio access network node 400a, 400b reports the KPI event to the OSS entity 300 independently from the time scheduled KPI reporting.

Embodiments relating to further details of handling network performance degradation in a communications system 100 as performed by the radio access network node 400a, 400b will now be disclosed.

As disclosed above, in some aspects, the radio access network node 400a, 400b is requested to send KPI reports without waiting for scheduled KPI reporting. Particularly, according to an embodiment the time scheduled KPI reporting specifies the radio access network node 400a, 400b to send its KPI reports only at scheduled KPI reporting occurrences, and the radio access network node 400a, 400b, in step S304, reports the KPI event without waiting for a next scheduled KPI reporting occurrence.

Examples of factors that cause the KPI event to occur have been provided above. In relation thereto, there may be different ways to for the radio access network node 400a, 400b to obtain the indication of the KPI event in step S302.

In some aspects, the KPI event is received in a KPI report from the wireless device 200. That is, according to an embodiment the indication of the KPI event is obtained in a KPI report from a wireless device 200.

In some aspects, the KPI event pertains to another radio access network node. That is, according to an embodiment the indication of the KPI event pertains to a KPI event at another radio access network node 400a, 400b.

In some aspects, the KPI event pertains to the radio access network node itself. That is, according to an embodiment the indication of the KPI event pertains to a KPI event at the radio access network node 400a, 400b itself.

In some aspects, the KPI event is discovered by the radio access network node itself (e.g. as a result of having performed auto-healing or an update at the radio access network node itself). That is, according to an embodiment the indication of the KPI event is caused by the radio access network node 400a, 400b having performed auto-healing or system updating.

A first particular embodiment for handling network performance degradation in a communications system 100 based on at least some of the above disclosed embodiments will now be disclosed in detail with reference to the communications system 100a of FIG. 5, in which RBS1 (short for first radio base station) represents radio access network node 400a, and RBS2 (short for second radio base station) represents radio access network node 400b.

S401: Wireless device 200 fails to establish a call with radio access network node 400a. In general, there could be N call setup failures.

S402: Wireless device 200 establishes the call with radio access network node 400b and in the call setup request message reports a KPI event (and thus provides a KPI report) informing that wireless device 200 has experienced N call setup failures with radio access network node 400a.

S403: Radio access network node 400b notifies OSS entity 300 of the KPI report.

S404: OSS entity 300 forwards the notification of the KPI report to radio access network node 400a and on triggers auto-healing on itself.

S405: Radio access network node 400a is by the notification triggered to perform auto-healing.

A second particular embodiment for handling network performance degradation in a communications system 100 based on at least some of the above disclosed embodiments will now be disclosed in detail with reference to the communications system 100b of FIG. 6 in which RBS1 represents radio access network nodes 400a, 400b (being one and the same radio access network node).

S501: Wireless device 200 drops an ongoing call with radio access network node 400a, resulting in a radio link failure (RLF).

S502: Wireless device 200 re-establishes the dropped call with radio access network node 400a and in the call re-establishment message reports a KPI event (and thus provides a KPI report) informing of the radio link failure.

S503: Radio access network node 400a notifies OSS entity 300 of the KPI report.

S504: OSS entity 300 triggers auto-healing to be performed at radio access network node 400a (and optionally at the OSS entity 300 itself).

S505: Radio access network node 400a is by the notification triggered to perform auto-healing.

A third particular embodiment for handling network performance degradation in a communications system 100 based on at least some of the above disclosed embodiments will now be disclosed in detail with reference to the communications system 100c of FIG. 7 in which RBS1 represents radio access network node 400a, and RBS2 represents radio access network node 400b.

S601: Wireless device 200 drops an ongoing call with radio access network node 400a, resulting in a radio link failure (RLF).

S602: Wireless device 200 re-establishes the dropped call but now with radio access network node 400b and in the call re-establishment message reports a KPI event (and thus provides a KPI report) informing of the radio link failure.

S603: Radio access network node 400b notifies OSS entity 300 of the KPI report.

S604: OSS entity 300 forwards the notification of the KPI report to radio access network node 400a (and optionally triggers auto-healing on itself).

S605: Radio access network node 400a is by the notification triggered to perform auto-healing.

A fourth particular embodiment for handling network performance degradation in a communications system 100 based on at least some of the above disclosed embodiments will now be disclosed in detail with reference to the communications system 100d of FIG. 8 in which RBS1 represents radio access network nodes 400a, 400b (being one and the same radio access network node).

In the scenario of FIG. 8 the wireless device 200 is assumed to be in idle mode. In general terms, whenever a wireless device 200 in idle mode experiences any bad radio conditions, it should immediately report this as an KPI event to the OSS entity 300. In that way, the OSS entity 300 could notify in advance any low latency wireless devices, e.g. a driverless car, heading towards the area in which the bad radio conditions were experienced. As a consequence, the low latency wireless device could avoid passing by that area.

S701: Wireless device 200 is in idle mode and experiences bad radio conditions, where the bad radio conditions are defined by at least one radio condition being below a threshold value.

S702: Wireless device 200 sends a network access request message in the form of a call establishment message to radio access network node 400b and in the network access request message reports a KPI event (and thus provides a KPI report) informing of the bad radio conditions. The KPI report might report about the radio conditions experienced by the wireless device 200, e.g. received level of RSRP and/or RSRQ, possibly together with geographical information identifying the area in which the bad radio conditions were experienced.

S703: Radio access network node 400b responds to the call establishment message with a network access reject message. This is done in order to terminate the call setup procedure at this stage.

S704: Radio access network node 400b notifies OSS entity 300 of the KPI report.

S705: OSS entity 300 forwards the notification of the KPI report to radio access network node 400a.

S706: Radio access network node 400a is by the notification triggered to perform auto-healing.

Figure 9:
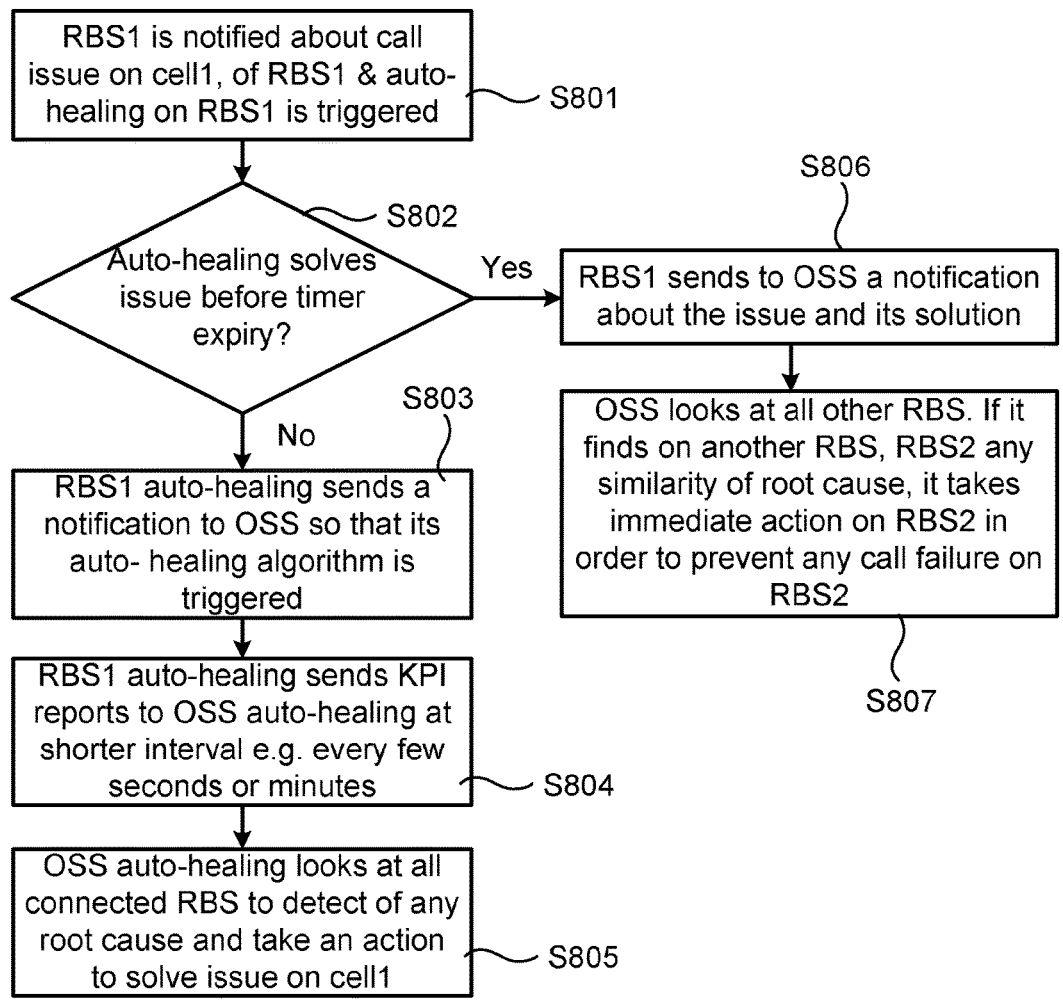

A fifth particular embodiment for handling network performance degradation in a communications system 100 based on at least some of the above disclosed embodiments will now be disclosed in detail with reference to the flowchart of FIG. 9 in which RBS1 represents radio access network node 400a, and RBS2 represents radio access network node 400b.

S801: Radio access network node 400a is notified about a KPI event caused by radio access network node 400a. This notification triggers auto-healing on radio access network node 400a.

S802: It is checked whether the auto-healing solves the issue causing the KPI event before a timer expires. If no, step S803 is entered, and else step S806 is entered.

S803: Radio access network node 400a sends a notification to OSS entity 300 to trigger auto-healing at OSS entity 300.

S804: Radio access network node 400a sends KPI reports to OSS entity 300 at short intervals, e.g. every few seconds or minutes, for the KPI reports to be used by the auto-healing at OSS entity 300.

S805: OSS entity 300 analyses information, such as KPI reports and alarms, received from all radio access network nodes 400a, 400b operatively connected to the OSS entity 300 in order to detect any root cause of the KPI event and take an action to solve the issue causing the KPI event at radio access network nodes 400a.

S806: Radio access network node 400a sends a notification to OSS entity 300 about the root cause of the KPI event and its solution, for example that the problem causing the KPI event was solved by reverting back to a changed parameter or parameters at radio access network node 400a via OSS entity 300.

S807: OSS entity 300 analyses information, such as a parameter change or KPI reports, received from all radio access network nodes 400a, 400b operatively connected to the OSS entity 300 in order to finds another radio access network node, such as radio access network node 400b, any similar of root cause, and takes immediate action on this another radio access network node 400b in order to possibly prevent any similar issues being caused at this another radio access network node 400b.

That is, if, within a predefined interval of time, the auto-healing on radio access network node 400a detects and fixes the issue causing the KPI event to occur, radio access network node 400a notifies OSS entity 300 about the KPI event and its solution and keeps sending KPI reports at long time intervals, such as every 15 minutes. Otherwise, radio access network node 400a not only notifies OSS entity 300 about the KPI event but in addition it starts sending KPI reports at short time intervals.

Figure 10:
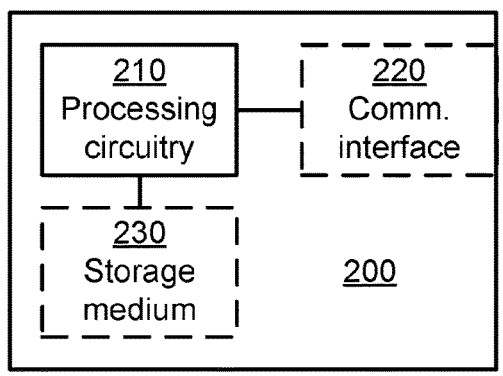
FIG. 10 is a schematic diagram showing functional units of a wireless device according to an embodiment.

FIG. 10 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-S106, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions. Thus, the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The wireless device 200 may further comprise a communications interface 220 for communications with other entities, nodes, and devices of the communication system 100, 100a, 100b, 100c, 100d. As such the communications interface 220 may comprise one or more transmitters and receivers, comprising analogue and digital components.

The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230. Other components, as well as the related functionality, of the wireless device 200 are omitted in order not to obscure the concepts presented herein.

Figure 11:
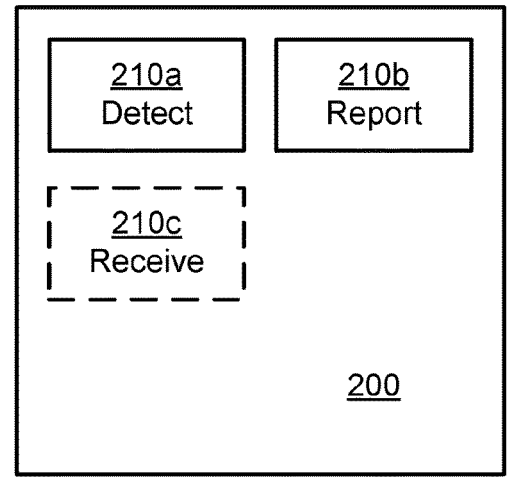
FIG. 11 is a schematic diagram showing functional modules of a wireless device according to an embodiment.

FIG. 11 schematically illustrates, in terms of a number of functional modules, the components of a wireless device 200 according to an embodiment. The wireless device 200 of FIG. 11 comprises a number of functional modules; a detect module 210a configured to perform step S102, and a report module 210b configured to perform step S104. The wireless device 200 of FIG. 11 may further comprise a number of optional functional modules, such as a receive module 210c configured to perform step S106. In general terms, each functional module 210a-210c may be implemented in hardware or in software. Preferably, one or more or all functional modules 210a-210c may be implemented by the processing circuitry 210, possibly in cooperation with the communications interface 220 and the storage medium 230. The processing circuitry 210 may thus be arranged to from the storage medium 230 fetch instructions as provided by a functional module 210a-210c and to execute these instructions, thereby performing any steps of the wireless device 200 as disclosed herein.

Examples of wireless devices 200 have been given above.

Figure 12:
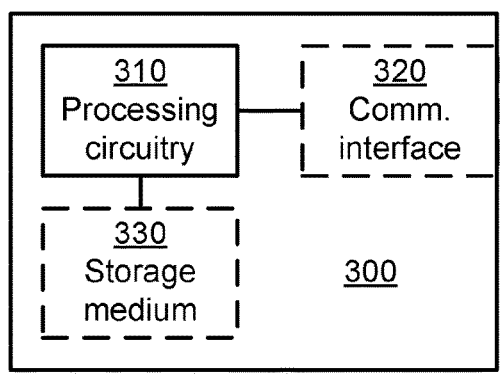
FIG. 12 is a schematic diagram showing functional units of an OSS entity according to an embodiment.

FIG. 12 schematically illustrates, in terms of a number of functional units, the components of an OSS entity 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the OSS entity 300 to perform a set of operations, or steps, S202-S208, as disclosed above. For example, the storage medium 330 may store the set of operations, and the processing circuitry 310 may be configured to retrieve the set of operations from the storage medium 330 to cause the OSS entity 300 to perform the set of operations. The set of operations may be provided as a set of executable instructions. Thus, the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The OSS entity 300 may further comprise a communications interface 320 for communications with other entities, nodes, and devices of the communication system 100, 100a, 100b, 100c, 100d. As such the communications interface 320 may comprise one or more transmitters and receivers, comprising analogue and digital components.

The processing circuitry 310 controls the general operation of the OSS entity 300 e.g. by sending data and control signals to the communications interface 320 and the storage medium 330, by receiving data and reports from the communications interface 320, and by retrieving data and instructions from the storage medium 330. Other components, as well as the related functionality, of the OSS entity 300 are omitted in order not to obscure the concepts presented herein.

Figure 13:
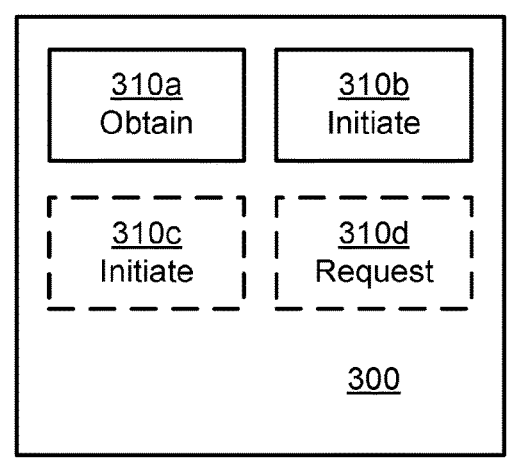
FIG. 13 is a schematic diagram showing functional modules of an OSS entity according to an embodiment.

FIG. 13 schematically illustrates, in terms of a number of functional modules, the components of an OSS entity 300 according to an embodiment. The OSS entity 300 of FIG. 13 comprises a number of functional modules; an obtain module 310a configured to perform step S202, and an initiate module 310b configured to perform step S204. The OSS entity 300 of FIG. 13 may further comprise a number of optional functional modules, such as any of an initiate module 310c configured to perform step S206, and a request module 310d configured to perform step S208. In general terms, each functional module 310a-310d may be implemented in hardware or in software. Preferably, one or more or all functional modules 310a-310d may be implemented by the processing circuitry 310, possibly in cooperation with the communications interface 320 and the storage medium 330. The processing circuitry 310 may thus be arranged to from the storage medium 330 fetch instructions as provided by a functional module 310a-310d and to execute these instructions, thereby performing any steps of the OSS entity 300 as disclosed herein.

The OSS entity 300 may be provided as a standalone device or as a part of at least one further device. For example, the OSS entity 300 may be provided in a node of the core network 120. Alternatively, functionality of the OSS entity 300 may be distributed between at least two devices, or nodes.

Thus, a first portion of the instructions performed by the OSS entity 300 may be executed in a first device, and a second portion of the of the instructions performed by the OSS entity 300 may be executed in a second device; the herein disclosed embodiments are not limited to any particular number of devices on which the instructions performed by the OSS entity 300 may be executed. Hence, the methods according to the herein disclosed embodiments are suitable to be performed by an OSS entity 300 residing in a cloud computational environment. Therefore, although a single processing circuitry 310 is illustrated in FIG. 12 the processing circuitry 210 may be distributed among a plurality of devices, or nodes. The same applies to the functional modules 310a-310d of FIG. 13 and the computer program 1620b of FIG. 16.

Figure 14:
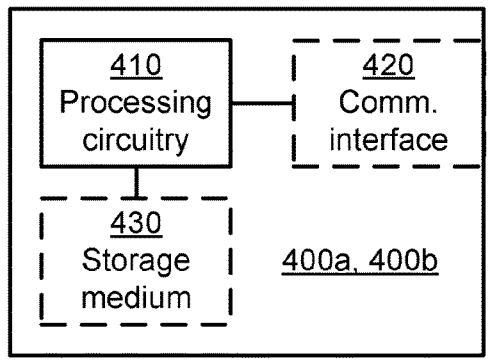
FIG. 14 is a schematic diagram showing functional units of a radio access network node according to an embodiment.

FIG. 14 schematically illustrates, in terms of a number of functional units, the components of a radio access network node 400a, 400b according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1610c (as in FIG. 16), e.g. in the form of a storage medium 430. The processing circuitry 410 may further be provided as at least one application specific integrated circuit (ASIC), or field programmable gate array (FPGA).

Particularly, the processing circuitry 410 is configured to cause the radio access network node 400a, 400b to perform a set of operations, or steps, S302-S304, as disclosed above. For example, the storage medium 430 may store the set of operations, and the processing circuitry 410 may be configured to retrieve the set of operations from the storage medium 430 to cause the radio access network node 400a, 400b to perform the set of operations. The set of operations may be provided as a set of executable instructions. Thus, the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The radio access network node 400a, 400b may further comprise a communications interface 420 for communications with other entities, nodes, and devices of the communication system 100, 100a, 100b, 100c, 100d. As such the communications interface 420 may comprise one or more transmitters and receivers, comprising analogue and digital components.

The processing circuitry 410 controls the general operation of the radio access network node 400a, 400b e.g. by sending data and control signals to the communications interface 420 and the storage medium 430, by receiving data and reports from the communications interface 420, and by retrieving data and instructions from the storage medium 430. Other components, as well as the related functionality, of the radio access network node 400a, 400b are omitted in order not to obscure the concepts presented herein.

Figure 15:
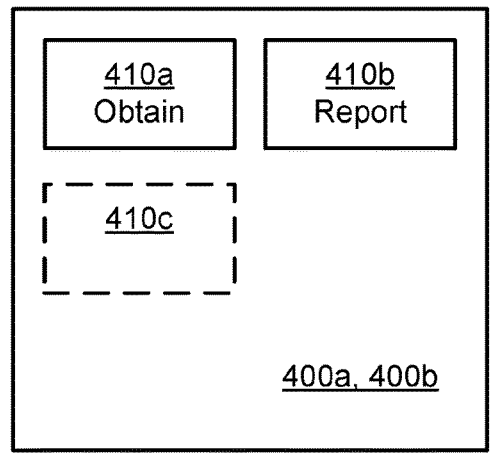
FIG. 15 is a schematic diagram showing functional modules of a radio access network node according to an embodiment.

FIG. 15 schematically illustrates, in terms of a number of functional modules, the components of a radio access network node 400a, 400b according to an embodiment. The radio access network node 400a, 400b of FIG. 15 comprises a number of functional modules; an obtain module 410a configured to perform step S302, and a report module 410b configured to perform step S304. The radio access network node 400a, 400b of FIG. 15 may further comprise a number of optional functional modules, as represented by module 410c. In general terms, each functional module 410a-410c may be implemented in hardware or in software. Preferably, one or more or all functional modules 410a-410c may be implemented by the processing circuitry 410, possibly in cooperation with the communications interface 420 and the storage medium 430. The processing circuitry 410 may thus be arranged to from the storage medium 430 fetch instructions as provided by a functional module 410a-410c and to execute these instructions, thereby performing any steps of the radio access network node 400a, 400b as disclosed herein.

Examples of radio access network nodes 400a, 400b have been given above.

The radio access network node 400a, 400b may be provided as a standalone device or as a part of at least one further device. For example, the radio access network node 400a, 400b may be provided in a node of the radio access network 110. Alternatively, functionality of the radio access network node 400a, 400b may be distributed between at least two devices, or nodes.

Thus, a first portion of the instructions performed by the radio access network node 400a, 400b may be executed in a first device, and a second portion of the of the instructions performed by the radio access network node 400a, 400b may be executed in a second device; the herein disclosed embodiments are not limited to any particular number of devices on which the instructions performed by the radio access network node 400a, 400b may be executed. Hence, the methods according to the herein disclosed embodiments are suitable to be performed by a radio access network node 400a, 400b residing in a cloud computational environment. Therefore, although a single processing circuitry 410 is illustrated in FIG. 14 the processing circuitry 410 may be distributed among a plurality of devices, or nodes. The same applies to the functional modules 410a-410c of FIG. 15 and the computer program 1620c of FIG. 16.

Figure 16:
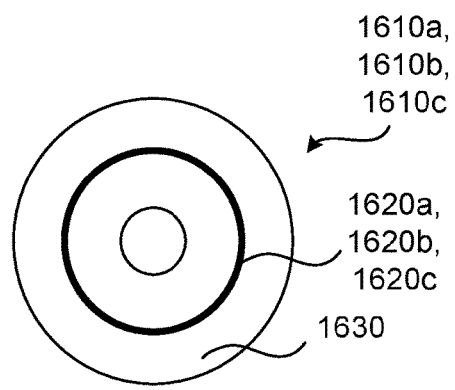
FIG. 16 shows one example of a computer program product comprising computer readable means according to an embodiment.

FIG. 16 shows one example of a computer program product 1610a, 1610b, 1610c comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the wireless device 200 as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the OSS entity 300 as herein disclosed. On this computer readable means 1630, a computer program 1620c can be stored, which computer program 1620c can cause the processing circuitry 410 and thereto operatively coupled entities and devices, such as the communications interface 420 and the storage medium 430, to execute methods according to embodiments described herein. The computer program 1620c and/or computer program product 1610c may thus provide means for performing any steps of the radio access network node 400a, 400b as herein disclosed.

In the example of FIG. 16, the computer program product 1610a, 1610b, 1610c is illustrated as an optical disc, such as a CD (compact disc) or a DVD (digital versatile disc) or a Blu-Ray disc. The computer program product 1610a, 1610b, 1610c could also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b, 1620c is here schematically shown as a track on the depicted optical disk, the computer program 1620a, 1620b, 1620c can be stored in any way which is suitable for the computer program product 1610a, 1610b, 1610c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

What is claimed is:

1. A method for handling network performance degradation in a communications system, the method being performed by a wireless device, the method comprising:
   detecting occurrence of a Key Performance Indicator (KPI) event associated with a first radio access network node;
   reporting the KPI event to an Operations Support System (OSS) entity via a second radio access network node; and
   wherein any one of the following applies:
      the KPI event is caused by a network access establishment failure, and wherein the KPI event is reported in a network access request message;
      wherein the KPI event is caused by a dropped network connection, and wherein the KPI event is reported in a network access re-establishment message; or
      the KPI event is caused by at least one radio condition being below a threshold value, and wherein the KPI event is reported in a modified network access request message.

2. The method according to claim 1, wherein, when the KPI event is caused by a network access establishment failure, the network establishment failure pertains to N successive failed attempts for network access establishment, where N>1, and wherein the N successive failed attempts are reported in the network access request message.

3. The method according to claim 2, wherein the wireless device is in connected mode when detecting the occurrence of the KPI event.

4. The method according to claim 1, wherein, when the KPI event is caused by the at least one radio condition being below the threshold value, the method further comprises receiving, from the second radio access network node, a network access reject message in response to having reported the KPI event.

5. The method according to claim 1, wherein the first radio access network node and the second radio access network node are two mutually different radio access network nodes.

6. The method according to claim 1, wherein the first radio access network node and the second radio access network node are one and the same radio access network node.

7. A method for handling network performance degradation in a communications system, the method being performed by an Operations Support System (OSS) entity, the method comprising:
   obtaining a Key Performance Indicator (KPI) report from a wireless device via a second radio access network node, wherein the KPI report pertains to occurrence of a KPI event as detected by the wireless device with respect to a first radio access network node;
   initiating auto-healing of the first radio access network node based on the KPI report, wherein said initiating is triggered by having obtained the KPI report; and
   initiating auto-healing of at least one of the second radio access network node and the OSS entity itself based on the KPI report, wherein said initiating is triggered by having obtained the KPI report.

8. A method for handling network performance degradation in a communications system, the method being performed by an Operations Support System (OSS) entity, the method comprising:
   obtaining a Key Performance Indicator (KPI) report from a wireless device via a second radio access network node, wherein the KPI report pertains to occurrence of a KPI event as detected by the wireless device with respect to a first radio access network node;
   initiating auto-healing of the first radio access network node based on the KPI report, wherein said initiating is triggered by having obtained the KPI report; and
   wherein the first radio access network node is configured for time scheduled KPI reporting to the OSS entity, and the method further comprises requesting the first radio access network node to send its KPI reports independently from said time scheduled KPI reporting.

9. The method according to claim 8, wherein the time scheduled KPI reporting specifies the first radio access network node to send its KPI reports only at scheduled KPI reporting occurrences, and wherein the first radio access network node is requested to send its KPI reports without waiting for a next scheduled KPI reporting occurrence.

10. A method for handling network performance degradation in a communications system, the method being performed by a radio access network node, wherein the radio access network node is configured for time scheduled Key Performance Indicator (KPI) reporting, the method comprising:
    obtaining an indication of a KPI event; and
    reporting the KPI event to an Operations Support System (OSS) entity independently from said time scheduled KPI reporting, wherein the time scheduled KPI reporting specifies the radio access network node to send its KPI reports only at scheduled KPI reporting occurrences, and wherein the radio access network node reports the KPI event without waiting for a next scheduled KPI reporting occurrence.

11. The method according to claim 10, wherein the indication of the KPI event is obtained in a KPI report from a wireless device.

12. The method according to claim 10, wherein the indication of the KPI event pertains to a KPI event at another radio access network node, or to a KPI event at the radio access network node itself.

13. The method according to claim 10, wherein the indication of the KPI event is caused by the radio access network node having performed auto-healing or system updating.

14. A radio access network node for handling network performance degradation in a communications system, wherein the radio access network node is configured for time scheduled Key Performance Indicator (KPI) reporting, the radio access network node comprising processing circuitry, the processing circuitry being configured to cause the radio access network node to:
    obtain an indication of a KPI event; and
    report the KPI event to an Operations Support System (OSS) entity independently from said time scheduled KPI reporting, wherein the time scheduled KPI reporting specifies the radio access network node to send its KPI reports only at scheduled KPI reporting occurrences, and wherein the radio access network node reports the KPI event without waiting for a next scheduled KPI reporting occurrence.

15. A wireless device for handling network performance degradation in a communications system, the wireless device comprising processing circuitry, the processing circuitry being configured to cause the wireless device to:
  detect occurrence of a Key Performance Indicator (KPI) event associated with a first radio access network node; and
  report the KPI event to an Operations Support System (OSS) entity via a second radio access network node;
wherein any one of the following applies:
  the KPI event is caused by a network access establishment failure, and wherein the KPI event is reported in a network access request message;
  wherein the KPI event is caused by a dropped network connection, and wherein the KPI event is reported in a network access re-establishment message; or
  the KPI event is caused by at least one radio condition being below a threshold value, and wherein the KPI event is reported in a modified network access request message.

16. An Operations Support System (OSS) entity for handling network performance degradation in a communications system, the OSS entity comprising processing circuitry, the processing circuitry being configured to cause the OSS entity to:
  obtain a Key Performance Indicator (KPI) report from a wireless device via a second radio access network node, wherein the KPI report pertains to occurrence of a KPI event as detected by the wireless device with respect to a first radio access network node;
  initiate auto-healing of the first radio access network node based on the KPI report, wherein said initiating is triggered by having obtained the KPI report; and
  initiate auto-healing of at least one of the second radio access network node and the OSS entity itself based on the KPI report, wherein said initiating is triggered by having obtained the KPI report.

* * * * *